UNITED STATES PATENT OFFICE.

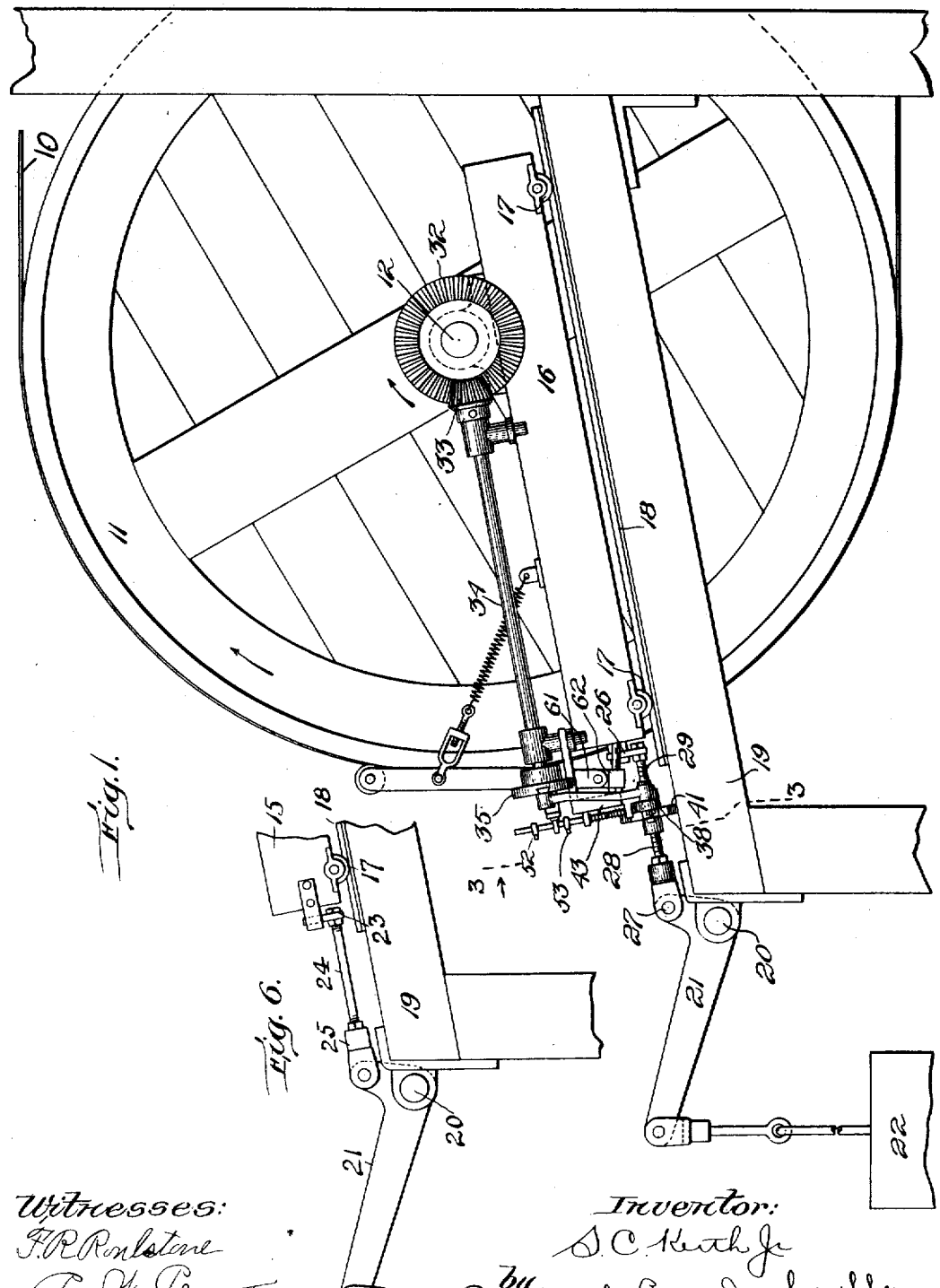

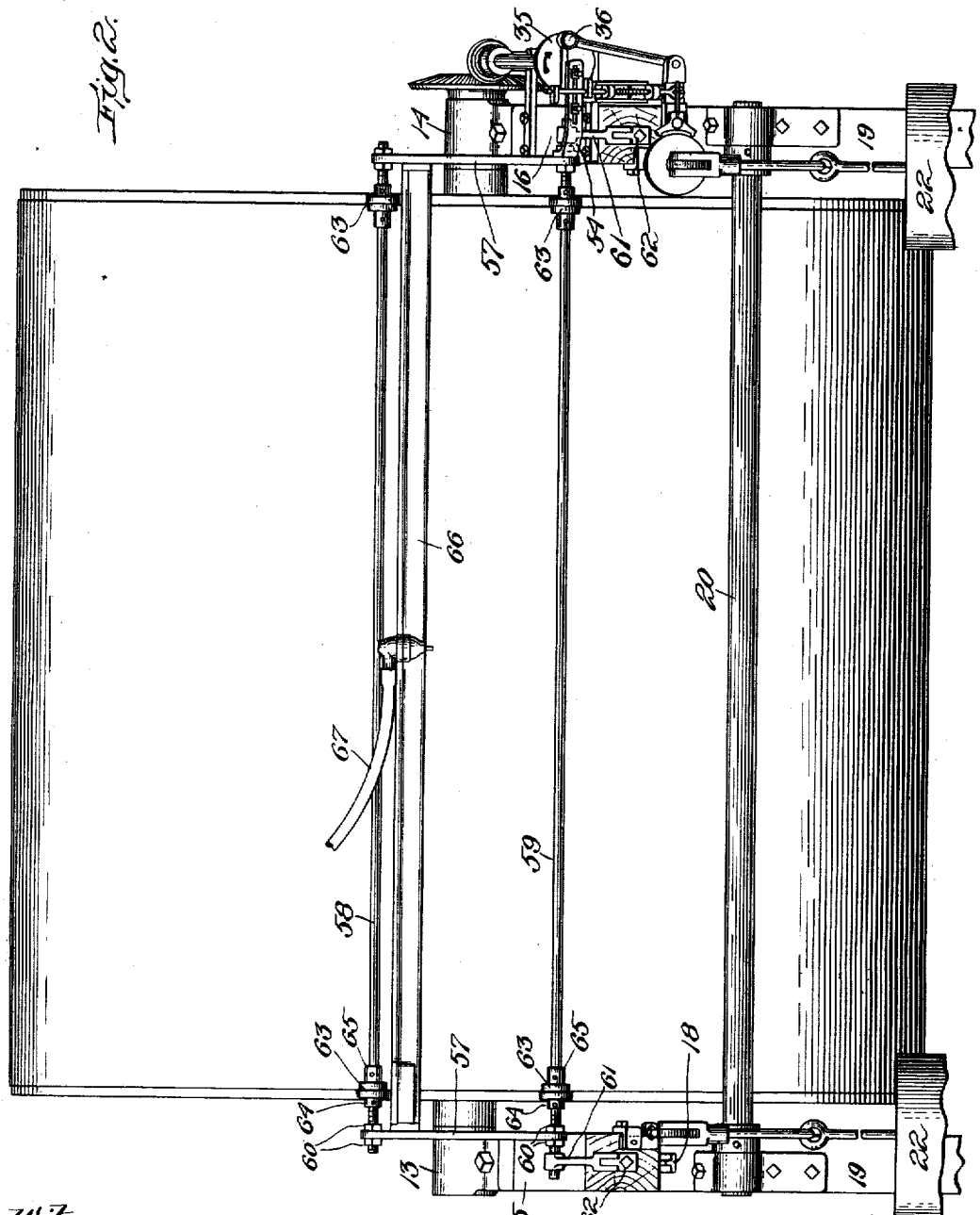

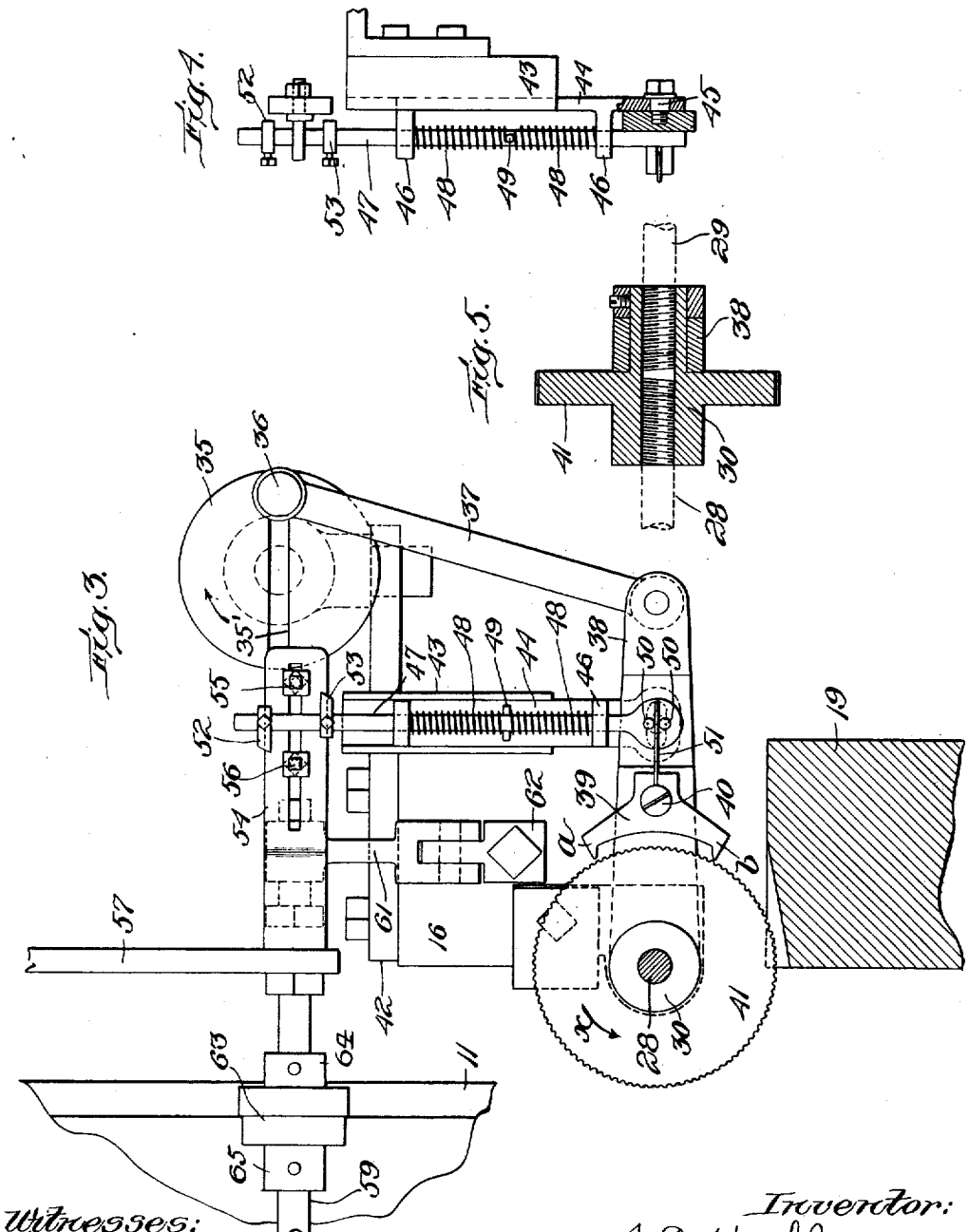

SIMEON C. KEITH, JR., OF SOMERVILLE, MASSACHUSETTS, ASSIGNOR TO H. J. KEITH COMPANY, OF BOSTON, MASSACHUSETTS, A CORPORATION OF MASSACHUSETTS.

BELT-GUIDING MECHANISM.

1,023,253.      Specification of Letters Patent.      Patented Apr. 16, 1912.

Application filed September 8, 1908. Serial No. 452,106.

*To all whom it may concern:*

Be it known that I, SIMEON C. KEITH, Jr., of Somerville, in the county of Middlesex and State of Massachusetts, have invented certain new and useful Improvements in Belt-Guiding Mechanism, of which the following is a specification.

This invention has relation to machines for the desiccation of egg and similar liquid or semi-liquid substances.

In such machines, as illustrated in the application Serial No. 401560, filed Nov. 11, 1907, the egg batter is dried upon an elongated belt supported by two drums or cylinders journaled in suitable bearings. In order that each successive film of egg may be dried after it has been deposited upon the belt and before a fresh film is deposited thereon, the belt is considerably elongated so that the egg will be subjected to the drying medium for a proper length of time. Considerable difficulty, however, has arisen on account of the length of the belt or carrier in effectively guiding it, and various plans have been tried or suggested for preventing the lateral movement of the belt relatively to the drums.

The present invention has for its object to eliminate the necessity of employing side guides for the belt and to provide mechanism for causing the belt to track properly upon the drums.

To this end the invention consists of means controlled by the belt or carrier for varying the position of one of the drums in the event that the belt tends to creep to one side or the other.

On the accompanying drawings, Figure 1 represents in side elevation, a portion of an egg drying machine equipped with my invention. Fig. 2 represents an end elevation of the same. Fig. 3 is a detail view as seen from line 3—3 of Fig. 1. Fig. 4 shows the slide and the pawl controller. Fig. 5 illustrates the nut and ratchet. Fig. 6 illustrates the connection between one of the drum supporting carriages and the weighted bell crank.

Reference may be had to the said application Serial No. 401,560, hereinbefore referred to, and also to my application Serial No. 410760, filed January 14, 1908, for a description of the machine to which this invention is applied. It is sufficient to state that the endless belt or carrier 10 is preferably formed of metal and is supported by two drums of which only one is shown at 11, the other not being shown. The drum which is not shown, is driven by suitable mechanism for effecting a longitudinal movement of the belt or carrier. The shaft 12 of the drum 11, is loosely journaled in bearings 13, 14 which are supported respectively by carriages 15 16. Each carriage consists of an elongated bar having small rollers or wheels 17 engaged with tracks 18. These tracks are inclined as shown, and are supported by the frame work 19 of the machine. Journaled on the framework, there is a cross bar 20 having supported upon it near its ends, bell crank levers 21. From the longer forwardly projecting arm of each lever is suspended a weight 22. The shorter arm of each bell crank lever, which projects upwardly is connected to one of the carriages. As shown in Fig. 6, the carriage 15 has a plate 23 secured thereto, which is connected by an elongated threaded bolt 24 with a yoke 25, the latter being pivoted to the short arm of the lever 21 at the end of the bar 20. Between the carriage 16 and the shorter arm of the bell crank 21 which is adjacent thereto, are interposed a plate 26 attached to the carriage 16, a yoke 27 pivoted to the bell crank, and a screw bar 28. This screw bar, however, is formed in two parts which are oppositely threaded and they are engaged with a nut 30 such as is shown in Fig. 5.

From the description thus far given it will be observed that the weighted bell cranks, the carriages, and the connections between the carriages and the bell cranks serve to keep the belt or carrier taut just as set forth in the earlier applications hereinbefore referred to.

I will now proceed to describe the mechanisms by means of which one of the carriages may be moved longitudinally with respect to the other so as to move angularly the drum shaft 12, in consequence of which the belt or carrier may return to its proper relation to the drum in the event that it has crept laterally in one direction or the other.

The shafts of the two drums are of course approximately parallel, but by moving one end of the shaft 12 toward or from the other drum, the belt may be caused to move laterally in one direction or the other. This angular variation of the shaft 12 is accomplished in the present case, by effecting a rotation of the nut 30 in one direction or the other so as to expand or contract the screw bar 28 which has the effect of moving the carriage 16 longitudinally. Any suitable or convenient mechanism controlled by the belt may be utilized to effect the movement of the nut 30. I have shown a convenient mechanism which I will now describe.

On the drum shaft 12, I place a bevel gear 32 which intermeshes with and drives a bevel pinion 33 secured on a shaft 34. This latter shaft is arranged parallel with the carriage 16 and is mounted in suitable journals secured upon the latter. At its forward end, the shaft 34 carries a crank disk 35 having in its face a slot 35' occupied by an adjustable crank pin 36. This crank pin is connected by a pitman 37 with an oscillatory arm 38 whose hub is journaled upon the nut 30 as shown in Fig. 5. While the drum is rotating, the arm 38 is slowly oscillated. The arm 38 serves as a carrier for a double pawl 39 pivoted upon a stud 40. Each end of the pawl is adapted to be engaged with the teeth of a ratchet 41 which for convenience may be formed integral with the nut 30 as shown in Figs. 3 and 5. While the belt is tracking properly, the pawl is held or remains out of engagement with the ratchet, but in case the belt is improperly tracking, that is, has crept laterally in one direction or the other, one end or the other of the pawl is caused to engage the ratchet and by the oscillation of the arm 38 to rotate said ratchet and the nut in the proper direction to vary angularly the position of the drum, until the belt has resumed its proper relation thereto.

On the end of the carriage 16 is a plate 42 which is formed with a vertical guide 43 in which is placed a slide 44. The lower end of the slide is slotted to receive a screw pin 45 which is passed therethrough into the pawl carrier 38. By means of this construction, the oscillation of the pawl carrier effects a vertical reciprocation of the slide 44. The said slide is formed with ears or lugs 46 in which is slidably placed a bar 47. This bar 47 is movable relatively to said slide but is normally held against such movement by two springs 48 which are interposed between the ears or lugs 46 and a pin 49 on the bar as shown in Fig. 4. From the lower end of the bar, which is laterally extended, as shown in Fig. 3, project two pins 50 50 which receive between them a flat spring 51 projecting outward from the pawl 39. The springs 48, as stated, yieldingly position the bar 47 with reference to the slide 44 and thus yieldingly position the pawl 39 so that it is inactive with respect to the ratchet 41. On the upper end of the bar 47 are placed two oppositely projecting fingers 52, 53. These are adjustable relatively to the bar 48 and may be secured after adjustment by set screws or other fastenings.

54 represents a plate which constitutes a stop carrier and which is controlled in position by the belt or carrier. This plate is slotted to receive two adjustable stops 55 56 which may be secured, after adjustment, by any suitable means. The stop carrier may be mounted in any convenient way so as to be engaged with the edges of the belt. Preferably I have mounted it upon the frame which carries the feeding trough. This frame consists of end bars 57 and rods 58 59. Said rods 58 and 59 are secured to the end bars 57 by nuts 60, the rod 59 being loosely journaled in arms 61 which are pivoted to plates 62 attached to the ends of the carriages 15 16. The stop carrier 54 as shown in Figs. 2 and 3, is secured to one of the end bars 57. Loosely journaled on the rods 58 59, are shoulder rolls 63 which are held against axial movement relatively to the rods by suitable sleeves 64 65 pinned thereon. The rolls at the opposite ends of the rods are oppositely arranged so that the shoulder portion of each roll engages the edge of the belt or carrier, the peripheral portions of the rolls engaging the outer surface of the belt and the peripheral surface of the drum. Inasmuch as the rods 59 are loosely supported in the arms 61, the frame as a whole is, by reason of the engagement of the rolls with the edges of the belt, caused to move laterally with the belt when the latter creeps in one direction or the other. This movement of the frame is imparted to the stop carrier which is moved laterally relatively to the pawl controlling rod 47 which carries the fingers 52 53.

Upon the frame is supported the feed trough which is indicated as a whole at 66 and to which the egg batter is supplied by conduits 67.

The operation of the mechanism is as follows:—The crank disk 35 is rotated in the direction of the arrow in Fig. 3 and the two stops 55 56 are separated far enough so that, when the belt is properly tracking, the fingers 52 53 will be reciprocated between them without engaging them. In the event that the belt fails to track properly, however, and creeps to the right in Fig. 3, the feed-trough-supporting frame will be moved to the right by reason of the engagement of its rolls 63 with the edges of the belt. This will in turn move the stop-supporting plate 54 to the right so as to bring the stop 56 into the path of the finger 52. Then, when the pawl carrying arm 38 is moved downward so as to carry the slide 44 downward, the finger 52 will engage the stop 56 and arrest the movement of the bar 47. The arrest of the bar 47 and the continued movement of the pawl carrier 38 will cause the pawl 39 to be moved about its pivot 40 so that its end *a* will engage the ratchet. The ends of the pawl however, are so formed that, as the arm 38 continues its downward movement, the pawl will slip over the teeth of the ratchet. When the arm 38 begins its upward movement, however, the end *a* of the pawl will so engage one of the teeth of the ratchet as to cause a partial rotation of the ratchet as the arm 38 continues its upward movement. The rotation of the ratchet in the direction of the arrow *x* in Fig. 3 tends to elongate the screw bar 28 so as to move the end of the drum shaft slightly in a direction away from the other drum. During each oscillation of the pawl carrying arm 38, the nut and the ratchet will be partially rotated until the stop 56 is moved out of the path of the finger 52. In the event that the belt should creep in the opposite direction so as to bring the stop 55 in the path of the finger 53, the upward movement of the rod or bar 47 will be arrested and the end *b* of the pawl be brought into engagement with the ratchet so that during each downward movement of the arm 38, the nut and ratchet will be rotated in a direction opposite to that indicated by the arrow *x* so as to contract or shorten the screw bar 28.

It will be understood that in lieu of the particular mechanism which I have illustrated and described, I may utilize any mechanical equivalents therefor, and that, while I have employed the frame which supports the feed trough as a means for moving the stop carrier, nevertheless I might mount the trough in some other way and use only the bar 59 with its rollers for the purpose of positioning the stop carrier. I prefer, however, the arrangement which I have illustrated and described as it is simple, compact and operates satisfactorily.

Viewed in one aspect of the case, it will be observed that the egg feeding means, *i. e.*, the feed trough and its supporting frame, is under the control of the belt or carrier and controls the operation of or renders active the drum-shifting mechanism. In another aspect, however, the frame considered apart from its function of supporting the feed trough constitutes a belt operated or belt-controlled device for governing the direction of movement of the belt-shifting mechanism. The movement of the drum as its position is angularly varied, is of course slight, but in case it should be so great as to tend to cramp the shaft which supports the drum in its bearings, the bearing standards may be mounted loosely upon their supporting carriages.

Having thus explained the nature of my said invention and described a way of constructing and using the same although without attempting to set forth all of the forms in which it may be made or all of the modes of its use, what I claim is:—

1. In an egg drying machine, a frame, a carrier belt, a drum therefor, independent carriages on said frame in which the drum shaft is journaled, a rock shaft, means for exerting rotative tension on said shaft, arms on said rock shaft, connections between said carriages and said arms, and automatic mechanism controlled by said belt for adjusting one of said carriages relatively to its connected arm to vary angularly the position of said drum.

2. In an egg drying machine, a frame, a carrier belt, a drum therefor, independent carriages on said frame in which the drum shaft is journaled, weighted means connected to said carriages for keeping the belt taut, and automatic mechanism controlled by said belt for adjusting one of said carriages relatively to the other to vary angularly the position of said drum.

3. In an egg drying machine, a frame, independent carriages movably supported thereon, a drum having its shaft journaled on said carriages, an endless carrier belt in part supported by said drum, a tensioned rock shaft, having arms thereon, independent connections between said arms and said carriages, one of said connections comprising a screw rod formed in two parts and a nut, and automatic mechanism controlled by the lateral movement of the belt for rotating said nut to vary the length of said screw rod.

4. In an egg drying machine, a frame, independent carriages movably supported thereon, a drum having its shaft journaled on said carriages, an endless carrier belt in part supported by said drum and automatic mechanism controlled by said belt for adjusting one of said carriages to vary angularly the position of said drum, said automatic mechanism comprising in part a pawl carrier, connections by which said pawl carrier is actuated by the drum, a ratchet adapted to be actuated by the pawl for adjusting one of said carriages, a pawl controller having fingers, and a stop carrier positioned by the belt and having stops for coacting with the fingers on said pawl controller to render the pawl active.

In testimony whereof I have affixed my signature, in presence of two witnesses.

SIMEON C. KEITH, Jr.

Witnesses:
  MARCUS B. MAY,
  P. W. PEZZETTI.